United States Patent [19]

de Groot et al.

[11] Patent Number: 5,081,710
[45] Date of Patent: Jan. 14, 1992

[54] LASER TRANSMITTER

[75] Inventors: Peter J. de Groot, Bethel; Francis X. D'Amato; Kotik Lee, both of Danbury, all of Conn.

[73] Assignee: Hughes Danbury Optical Systems, Inc., Danbury, Conn.

[21] Appl. No.: 517,095

[22] Filed: May 1, 1990

[51] Int. Cl.⁵ .......................................... H04B 10/00
[52] U.S. Cl. .................................... 359/184; 359/182
[58] Field of Search ............... 455/618, 609, 608, 617, 455/611, 613; 372/26, 28

[56] References Cited

U.S. PATENT DOCUMENTS

| 3,705,992 | 12/1972 | Ippen et al. | 455/618 |
| 4,561,119 | 12/1985 | Epworth | 455/609 |
| 4,627,106 | 12/1986 | Drake | 455/617 |
| 4,748,687 | 5/1988 | Auracher et al. | 455/609 |
| 4,805,235 | 2/1989 | Henmi | 455/618 |

OTHER PUBLICATIONS

"Mode Control of an Array of AlGaAs Lasers Using a Spatial Filter in a Talbot Cavity", by F. X. D'Amato, E. T. Siebert and C. Roychoudhuri, SPIE Proc. 1043, p. 100 (1989).

Primary Examiner—Curtis Kuntz
Assistant Examiner—Kinfe-Michael Negash
Attorney, Agent, or Firm—Robert A. Hays; William J. Streeter; Wanda K. Denson-Low

[57] ABSTRACT

An optical transmitter includes at least one single-mode type laser diode for producing laser emission, and an external cavity with a partial reflector for reflecting a portion of the emission back into the laser. A DC current operates the laser in a first mode with a first frequency of emission. The laser is pulsed with a predetermined sequence of signal pulses each shifting the laser to a second mode with a second frequency different than the first frequency. The frequency shifting thereby constitutes information in a laser beam corresponding to the sequence of signal pulses. The laser system may be formed of a plurality of laser diodes in an array, so that the reflector reflects emission back into the diodes to lock them in the alternate modes of operation.

15 Claims, 2 Drawing Sheets

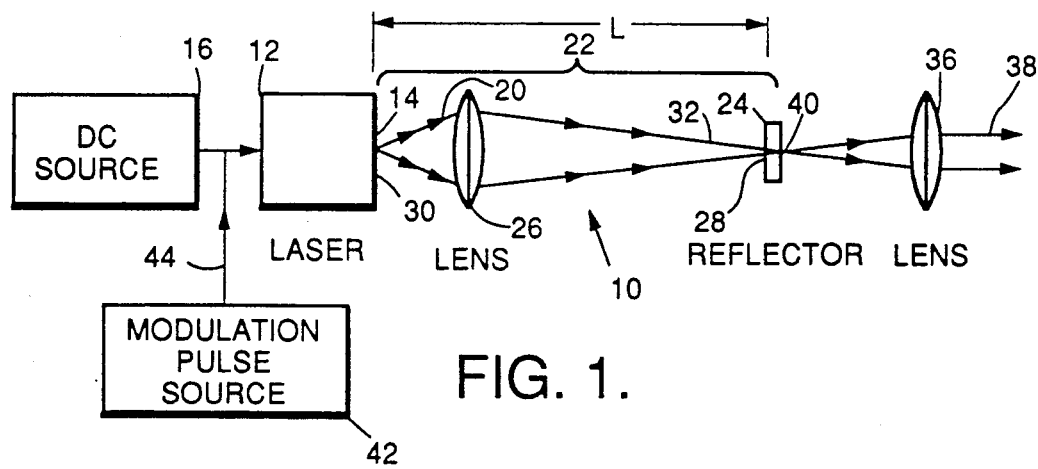
FIG. 1.
FIG. 2a.
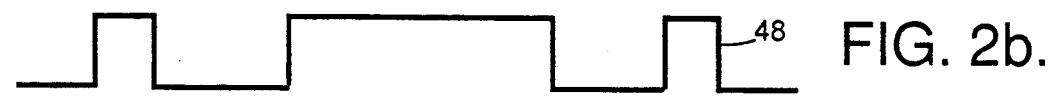
FIG. 2b.
FIG. 3.
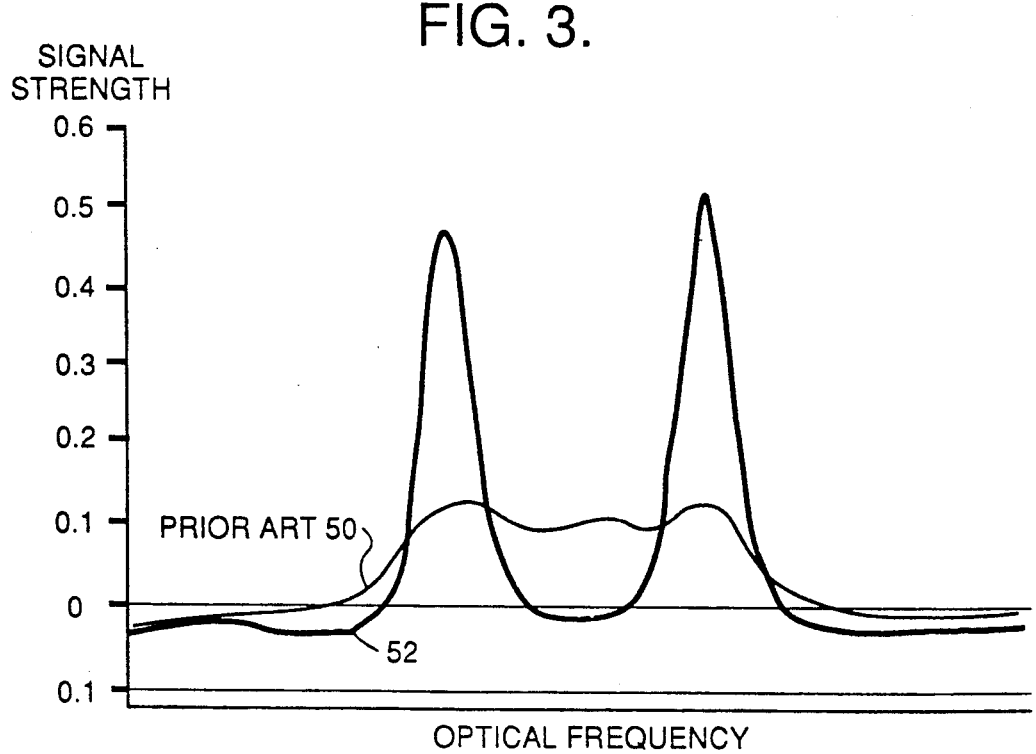

LASER TRANSMITTER

This invention relates to optical transmitters of information, and particularly to a laser diode transmitting system.

BACKGROUND OF THE INVENTION

The use of lasers is gaining interest for transmitting information optically, either for long or short distances on earth or in space. Such devices are also of interest for optical computers. Optical transmissions have potential advantages of great speed, because of the high speed of light and the high optical frequencies compared to electronic based systems.

A laser diode provides a high efficiency, compact means for converting electronic signals to optical signals. For example an amplitude modulation of the driver current for the diode generates a frequency modulation in the optical frequency of the laser. Such a simple modulation is not very useful for conveying complex information, e.g. binary information. Application of small signal pulses to a diode ordinarily results in non-linear responses in the diode because response varies with the modulation frequency. A further problem is the relative low power output of a laser diode.

Monolithic laser diode arrays have the potential for providing quasi-continuous-wave output power greater than 50 W, compared with 3 mW for a single diode in typical single-mode operation. U.S. patent application Ser. No. 232,074 now U.S. Pat. No. 4,927,263 filed Aug. 15, 1988 (de Groot et al) of the present assignee discloses use of an array of laser diodes incoherently for position and velocity imaging of a target. Phase locking of small incoherent arrays has been demonstrated using an external cavity and optical feedback to force mutual coherence between the diodes, as disclosed, for example, in "Mode control of an array of Alga-As lasers using a spatial filter in a Talbot cavity", by F. X. D'Amato, E. T. Siebert and C. Roychoudhuri, SPIE Proc. 1043, Pg. 100 (1989).

Ordinarily the addition of an external cavity to the diode array considerably complicates the modulation problem, because the external cavity tends to make stationary many of the source characteristics that one might wish to modulate in order to encode information. In particular, the frequency locking behavior of an external cavity precludes frequency modulation except in those special cases where the modulation spectrum matches the mode structure of the cavity.

SUMMARY OF THE INVENTION

An object of the invention is to provide a novel optical transmitter of information with improved speed and accuracy. Another object is to provide optical transmission of information by utilizing mode switching in a laser diode. A further object is to provide a novel system with an array of laser diodes for transmitting optical information at higher power levels.

The foregoing and other objects are achieved by an optical transmitter of information, comprising laser means including a single-mode type laser diode for producing laser emission, external cavity means including a reflector for reflecting at least a portion of the emission back into the laser means, power supply means for providing DC current to the laser means so as to operate the laser means in a first mode with a corresponding first frequency of emission, and pulse means for pulsing the laser diode with a predetermined sequence of signal pulses such that each signal pulse causes shifting of operation of the laser means to a second mode with a corresponding second frequency of emission different than the first frequency. The frequency shifting in the emission constitutes information in the emission corresponding to the predetermined sequence of signal pulses. The reflector is a partial reflector for reflecting a first portion of the emission back into the laser means, and transmitting a second portion of the emission out of the cavity means as a laser beam, so that the beam conveys the information.

In a preferred embodiment the laser means is formed of a plurality of substantially identical single-mode type laser diodes arranged contiguously in an array. The diodes have front facets lying substantially in a common plane disposed so that the reflector reflects emission back into the plurality of diodes to lock the diodes in a common first mode of operation having the first frequency. The pulse means pulses at least one of the diodes with the predetermined sequence of signal pulses such that each signal pulse causes shifting of operation of the plurality of laser diodes to a common second mode of operation having the second frequency.

BRIEF DESCRIPTION OF THE DRAWINGS

FIG. 1 is a schematic drawing of an optical transmitter according to the invention.

FIGS. 2a and 2b illustrates alternative types of pulse sequences for the apparatus of FIG. 1.

FIG. 3 compares laser frequencies of the apparatus of FIG. 1 with prior art.

DETAILED DESCRIPTION OF THE INVENTION

Figure 4:
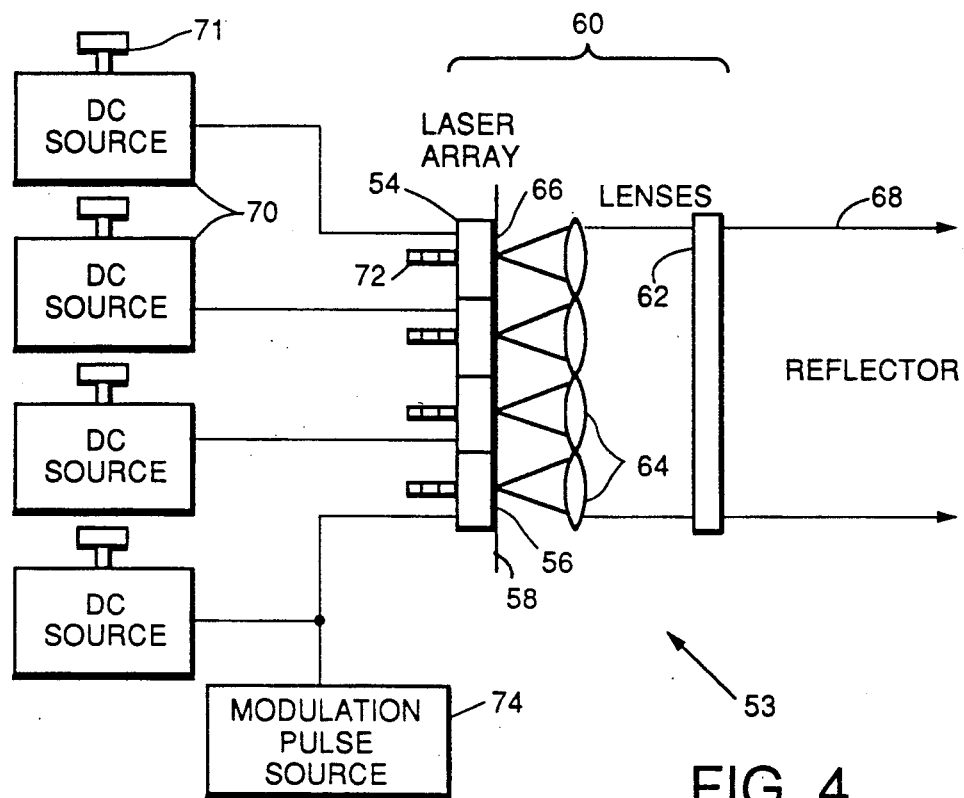
FIG. 4 is a schematic drawing of a further embodiment of an optical transmitter according to the invention.

With reference to FIG. 1, an optical laser transmitter 10 includes a semiconductor laser diode 12 such as a Sharp LT015MDO. For clarity conventional mounting to an optical bench or the like is not shown. The front facet 14 of the diode should have an anti-reflective coating. A DC power supply 16 provides a suitable DC current on a lead 18 to the diode to cause lasing of the diode at a selected mode of optical frequency. Substantially single mode operation of the laser is important and may be assured by measuring the spectrum with an optical spectrum analyzer (not shown) which may be removed when parameters are set and the system is in actual use. Coherent emission 20 is emitted and passed through the front facet 14 of the diode, shown to be emitted in the right-hand direction in the figure.

An external cavity 22 is defined between the front facet 14 of the laser and a partial reflector 24 spaced from the front facet. The reflector is preferably a partially reflective mirror, such as an 80% reflector. Broadly the mirror should be between about 10% and 95% reflective. Alternatively (not shown) the partial reflector may be a fully reflective mirror with an orifice therein, or a full mirror offset from the axis of the laser beam.

The external cavity means 22 preferably includes a lens 26, such as a single lens or a compound lens with two lens components. The cavity lens 26 is disposed in the beam 20 between the partial reflector 24 and the front facet 14, and, in one embodiment, has its conjugate foci 28,30 positioned respectively at the partial reflector and the front facet. Advantageously, particularly in a laboratory bench system, the reflector 24 and the cavity lens 26 have micrometer screw adjustors (not shown) for fine tuning and orientations transverse and longitudinal positions in the laser beam.

The partial reflector 24 reflects a first portion 32 of the emission back through the lens 26 into the laser diode 12 to effect a coherent modification of the laser emission. The external cavity 22 thus provides optical feedback as an integral part of the laser emission system.

A second portion 34 of the laser emission, generally the remainder of the unreflected beam incident on the reflector, is passed through the partial reflector 24 out of the external cavity 22 as a laser beam. This beam 34 is directed through space toward a receiver (not shown), or may be directed into a fiber optics network (also not shown). The beam may be sent to a relatively remote receiver, or the transmitter system may be used within a further system such as an optical computer.

An objective lens 36 may be positioned beyond the reflector 24 with a focal point 40 positioned at the reflector so as to render a parallel beam 38 for long distance transmission, or to focus to a closer receiver. As an alternative (not shown in FIG. 1), the second lens 36 may be omitted, and the first lens 26 may be positioned with its focal point at the diode facet so as to provide the parallel beam through the reflector.

Single mode operation is facilitated by operating the laser at relatively low power, near threshold. This results in a reduction of the source-light coherence length. Coherence length L is defined conventionally as $L = c/f$, where f is FWHM (full width at half maximum) linewidth and c is light velocity. With the present diode running at 2.5% of its maximum rated power of 30 mW, $f = 380$ MHz, and coherence length is about 30 cm. The cavity length L (between facet 22 and reflector 36) should be as long as practical but less than a critical distance that could allow mode shifting or other significant multimode operation.

The critical distance is roughly about half of the coherence length but should be determined empirically. Too long a cavity can cause multi-mode operation even with a single-mode type of laser diode with optimum driving current. However, if more compactness is desired without a need for maximum range or sensitivity, the cavity may be made shorter. Generally for conventional single-mode laser diodes the cavity length should be between 1 cm and 25 cm.

Generally the system will operate in a stable mode, substantially single-mode, with the optical laser frequency locking into a resonant frequency of the cavity. A significant change in cavity length may cause a change in optical frequency mode. If the resonant frequency of the cavity is nearly equal to a natural laser frequency there may be a tendency for mode switching. This may be avoided if desired by changing the diode current or the cavity length, or both in synchronous tuning, sufficiently to correct the instability. Alternatively electronic feedback with a lock-in amplifier or the like may be incorporated.

Utilizing an external cavity composed of two lenses near the diode with a combined focal length of 8.6 mm and 0.5 numerical aperture, and a 40% reflector placed 13 cm from a Sharp LT015MDO laser diode emitting at a frequency of $3.615 \times 10^{14}$ Hz, the external cavity reduced threshold current level from 43 to 35 mA. Longitudinal mode frequency spacing f of successive modes is dependent on the external cavity length L according to the relationship $f = c/2L$ where c is light velocity. Actual frequency also is dependent on driver current. Further according to the invention the laser is additionally pumped by current pulses added to the DC current, by a current signal pulse supply 42 via a line 44. The amplitude of the pulses is such that, for the duration of each pulse, the mode is shifted to a second mode, and the laser operates at a second frequency different than the first frequency. Other means may be used for pulsing the laser, such as applying an auxiliary potential to the diode to modulate the carrier density in the semiconductor.

The frequency shifting is utilized to convey information in the laser beam. Thus the laser may be pulsed with a predetermined sequence of signal pulses corresponding to the information conveyed. In one aspect (FIG. 2a) the signal pulses 46 are short and the sequential spacings of subsequent pulses provide the information in the beam. This type of pulsing may convey the information digitally. In another aspect (FIG. 2b) the pulses 48 may be square pulses with varying sequential durations corresponding to the information, or both type sequences combined. High data rates of 1 MHz to 1 GHz are possible.

The receiver of the information carried in the beam may be any conventional or desired optical system suitable for the purpose. (The receiver is not an aspect of the present invention.) For example a simple spectral analyzer or an interferometer may be used. In either case a photodetector may be positioned to detect the light at only one of the mode frequencies, such as the second frequency. High sensitivity may be attained with a local oscillator at the receiver with heterodyne detection, and a local laser diode oscillator could be tuned to compensate for doppler shifting of return signal frequencies. The signal could be captured by a rapid scan of the possible doppler shifts and a simultaneous search for a beam signal of the appropriate tone spacing.

FIG. 3 illustrates the importance of the external cavity. With a Sharp LT015MDO diode, signal pulses were supplied from a signal generator in the form of a simple sinusoidal AM current of 1 mA at 1 MHz added to a DC current of 40 mA. Without the external cavity (prior art) the laser optical frequency 50 was spread over about a 1 GHz range. With an external cavity of length 25 cm the laser optical frequency 52 was alternately locked between two frequencies separated by 600 MHz.

The above-described embodiment with a single laser diode is suitable where the low power is sufficient, particularly for short distance transmission. Higher power and longer distance is achieved with a plurality of diodes in an array. The external cavity is particularly important in such an arrangement in order to lock in all of the diodes to the same mode, frequency and phase.

Thus, according to a preferred embodiment of a transmitter 53 illustrated in FIG. 4, a laser means is formed of a plurality of substantially identical, single-mode type laser diodes 54 arranged contiguously in an array. The diodes have front facets 56 lying substantially in a common plane 58. An external cavity 60 of the type described above is formed by a partial reflector 62 which partially reflects and transits beams from all of the diodes. One cavity lens may be used for all diodes or, as shown, a number of such lenses 64 such as one for each diode. In this example these lenses are positioned with their focal points 66 on the diode facets so the lenses also act as an objective lens system for effecting a parallel laser beam 68 passed through the partial reflector. This beam is made up of the combined beams from each of the lasers.

The diodes may have a common DC power supply or, as shown, each diode may have its corresponding power supply 70 for DC driving current. It is important that the diodes all be tuned to the same frequency. This may be effected conventionally by separately tuning each DC current as with a knob 71. Positioning is also important, achievable by supporting each diode on a micrometer mount 72 so as to allow adjustment normal to the common plane 58.

The external cavity 60 effects mixed optical feedback of all laser emissions to all diodes. With proper tuning of each DC current and/or position of the diodes the feedback will cause all of the diodes 54 to operate in a single mode at the same phasing. Thus the laser array may be scaled to much higher power than for a single laser. The upper limit depends on the practicalities of arranging and tuning a large number of diodes with a single external cavity.

The pulsing may be effected by applying current pulses simultaneously to all of the diodes. A simple and preferred way is to apply a current pulse from a pulse source 74 to only one master laser, or only a few of the diodes. The feedback through the external cavity will provide injection locking to cause all of the lasers to switch modes. Either way, signal pulsing applied to the laser means generates controlled mode switching in the output beam conveying information as described above for a single laser diode.

Figure 5:
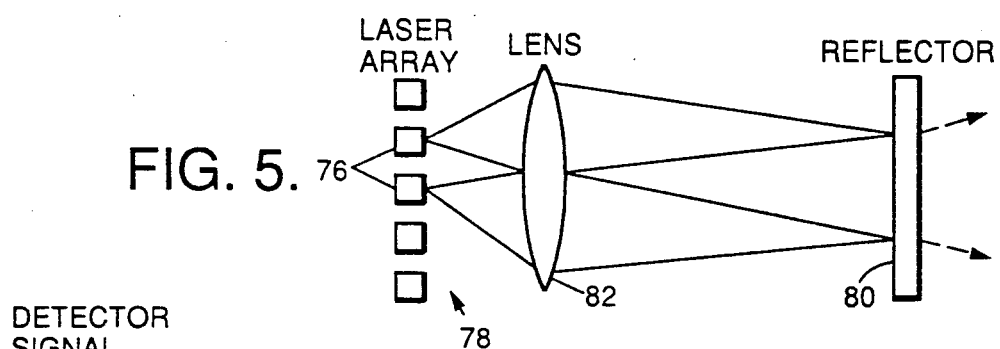
FIG. 5 is a schematic drawing of a test optical transmitter according to the invention.

In an experiment two diodes 76, from a linear five-element array 78, of the single-mode index-guided devices, were locked together by simple coupling with an 80% mirror 80 and a cavity lens 82 as shown in FIG. 5. Single mode operation was obtained when the diodes were pumped at a current level of 145 mA, below the 150 mA lasing threshold with no external feedback. Imposing a 0.6 mA AC current on the pump current caused mode switching with a frequency difference of 1.5 GHz for the cavity length of 10 cm.

Figure 6:
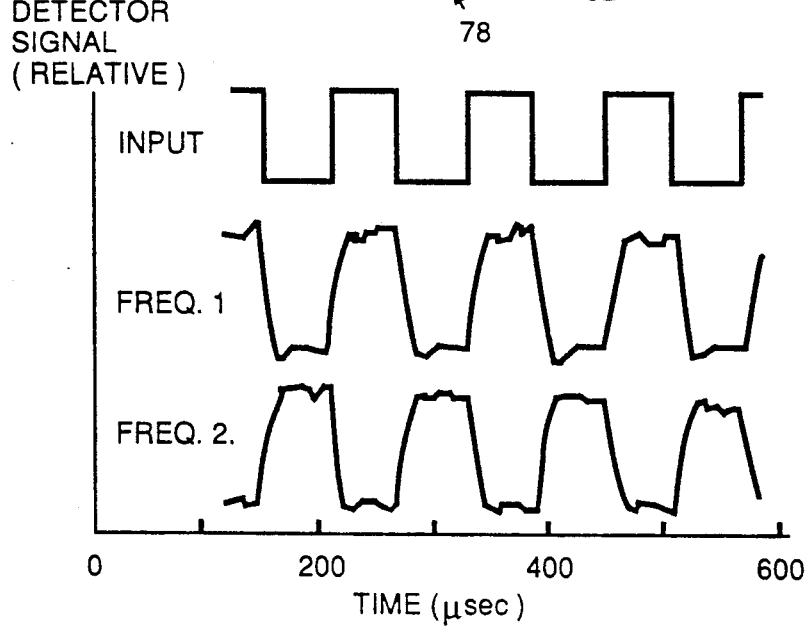
FIG. 6 compares pulses and laser frequencies of the apparatus of FIG. 5.

In a further experiment the system of FIG. 5 was fed signal pulses in the form of a 5 KHz square wave at 0.3 mA amplitude. FIG. 6 shows the mode switching effect, with alternating between the two mode frequencies. The frequencies were detected with a conventional optical frequency analyzer.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. An optical transmitter of information, comprising:
   means for producing laser emission, said laser emission producing means including a single-mode type laser diode;
   means for reflecting at least a portion of said emission back into said laser diode, said reflecting means including an external cavity including a reflector.
   means for providing DC current to said laser diode so as to operate said laser diode in a first mode having a corresponding first frequency of emission; and,
   means for pulsing said DC current with a predetermined sequence of signal pulses such that each signal pulse causes shifting of operation of said laser diode to a second mode, said second mode having a corresponding second frequency of emission different than said first frequency, whereby the frequency shifting in the emission constitutes information in the emission corresponding to the predetermined sequence of signal pulses.

2. The transmitter according to claim 1 wherein said reflector is a partial reflector for reflecting a first portion of said emission back into said laser diode, and transmitting a second portion of said emission out of said cavity as a laser beam, so that said beam conveys the information.

3. The transmitter according to claim 2 wherein said partial reflector comprises a partially reflective mirror.

4. The transmitter according to claim 2 further comprising objective lens means positioned to direct said beam substantially linearly away from said cavity means.

5. The transmitter according to claim 4 wherein said laser diode has a front facet for passing said emission from said diode, and said objective lens means has a focal point and is disposed in said beam between said reflector and said front facet with said focal point at said front facet.

6. The transmitter according to claim 1 wherein said laser diode has a front facet for passing said emission from said diode, and said cavity further includes a lens disposed in said beam between said reflector and said partial reflector and said front facet.

7. The transmitter according to claim 1 wherein said reflector is spaced from said laser diode by a cavity length less than a critical distance of multimode operation.

8. The transmitter according to claim 7 wherein said cavity distance is between about 1 cm and 25 cm.

9. The transmitter according to claim 1 wherein said signal pulses have sequential spacings corresponding to the information.

10. The transmitter according to claim 1 wherein said signal pulses are square pulses with sequential durations corresponding to the information.

11. An optical transmitter of information, comprising:
   means for producing laser emission, said laser emission producing means including a plurality of substantially identical single-mode type laser diodes arranged contiguously in an array, the diodes having front faces lying substantially in a common plane disposed so that the reflector reflects emission back into the plurality of diodes to lock the diodes in a common first mode of operation having the first frequency;
   means for reflecting at least a portion of said emission back into said laser diodes, said reflecting means including an external cavity including a reflector;
   means for providing DC current to said laser diodes so as to operate said laser diodes in a first mode having a corresponding first frequency of emission; and means
   means for pulsing said DC current to at least one of said diodes with a predetermined sequence of signal pulses such that each signal pulse causes shifting of operation of said laser diode to a second mode, said second mode having a corresponding second frequency of emission different than said first frequency, whereby the frequency shifting in the emission constitutes information in the emission corresponding to the predetermined sequence of signal pulses.

12. The transmitter according to claim 11 wherein said power supply means provides a separately tunable DC current to each of said plurality of diodes so as to provide for tuning of each said diode to lock in said common first mode and said first frequency.

13. The transmitter according to claim 11 further comprising a plurality of micrometer mounts each supporting one of said diodes and being adjustable normal to said common plane so as to accurately position each said diode with respect to said reflector to lock in said common first mode.

14. The transmitter according to claim 11 wherein the pulse means pulses the DC current of less than all of said plurality of diodes.

15. The transmitter according to claim 14 wherein the pulse means pulses the DC current supplied to only one of said plurality of diodes.

* * * * *